United States Patent [19]
McCarthy et al.

[11] Patent Number: 5,794,143
[45] Date of Patent: *Aug. 11, 1998

[54] METHOD AND APPARATUS FOR FACILITATING THE ULTIMATE MAKING OF WIRELESS CALLS TO UNAVAILABLE WIRELESS TELEPHONES

[75] Inventors: Michael Edward McCarthy, Great Meadows; James A. Tavares, Eatontown, both of N.J.

[73] Assignee: Lucent Technologies, Inc., Murray Hill, N.J.

[*] Notice: The term of this patent shall not extend beyond the expiration date of Pat. No. 5,513,342.

[21] Appl. No.: 691,439

[22] Filed: Aug. 2, 1996

Related U.S. Application Data

[63] Continuation of Ser. No. 251,497, May 31, 1994, abandoned.

[51] Int. Cl.$^6$ ............................................. H04Q 7/38
[52] U.S. Cl. ..................... 455/422; 455/435; 455/456; 455/414
[58] Field of Search ....................... 455/422, 421, 455/417, 432, 435, 414; 379/210, 209

[56] References Cited

U.S. PATENT DOCUMENTS

| | | | |
|---|---|---|---|
| 4,723,273 | 2/1988 | Diesel et al. | 379/211 |
| 5,233,641 | 8/1993 | Maeda | 455/567 |
| 5,311,570 | 5/1994 | Grimes et al. | 455/417 |
| 5,313,515 | 5/1994 | Allen et al. | 455/413 |
| 5,375,161 | 12/1994 | Fuller et al. | 379/57 |
| 5,418,835 | 5/1995 | Frohman et al. | 379/57 |
| 5,513,242 | 4/1996 | Mukerjee et al. | 455/435 |

FOREIGN PATENT DOCUMENTS 2193861 2/1988 United Kingdom.

OTHER PUBLICATIONS

Hientz et al, "Der Short Message Service—ein never Dienst der digitalen Mobilkommunikation", Vorträge der ITG–Fachtagung vom 27. bis 29. Sep. 1993 in Nev–Ulm.

*Primary Examiner*—Dwayne D. Bost
*Assistant Examiner*—Myron K. Wyche
*Attorney, Agent, or Firm*—Eugene J. Rosenthal, Esq.

[57] ABSTRACT

The problems with reaching unavailable mobile telephones, and the unnecessary costs associated therewith are avoided by a) marking as unavailable a wireless telephone to which a wireless telephone call could not successfully be completed; b) waiting for the wireless telephone to register, i.e., signal its availability to receive calls; and c) notifying the caller of the wireless telephone call that could not successfully complete that the wireless telephone is now available. Optionally, any call attempts to the wireless telephone during this waiting period are disallowed, i.e., no attempt is made to contact the wireless telephone over the wireless telephone service provider's network. Furthermore, resources of the wireless telephone service provider may be conserved, and unnecessary costs avoided, by disallowing call attempts to the wireless telephone during the waiting period, even if the caller of the wireless telephone call that could not successfully complete is not notified of the availability of the wireless telephone upon its registration. Additionally, if the wireless telephone shares communication facilities with a wireless data station, no attempt is made to transfer data to or from the wireless data station during the waiting period. Instead, the data is queued and the queued data is transmitted after the registration is received.

16 Claims, 4 Drawing Sheets

METHOD AND APPARATUS FOR FACILITATING THE ULTIMATE MAKING OF WIRELESS CALLS TO UNAVAILABLE WIRELESS TELEPHONES

This is a Continuation of application Ser. No. 08/251,497 filed May 31, 1994, now abandoned.

TECHNICAL FIELD

This invention relates to the making of telephone calls to wireless telephones that may become temporarily unavailable.

BACKGROUND OF THE INVENTION

Wireless telephones are sometimes unavailable for receipt of telephone calls. This unavailability may result because the wireless telephone is 1) off, 2) out of range, or 3) in an area which cannot be penetrated by the wireless telephone signal. At present, there is no mechanism for informing a caller, who has placed a call to an unavailable wireless telephone that the wireless telephone has become available again to receive calls. Also, constantly attempting to establish a wireless connection to an unavailable wireless telephone is wasteful of the resources of the wireless telephone service provider serving the called party as well as of any other telephone service provider, e.g., interexchange carrier, carrying the call.

SUMMARY OF THE INVENTION

The foregoing problems are overcome by, in accordance with the principles of the invention, a) marking as unavailable a wireless telephone to which a wireless telephone call could not successfully be completed; b) waiting for the wireless telephone to register, i.e., signal its availability to receive calls; and c) notifying the caller of the wireless telephone call that could not successfully complete that the wireless telephone is now available. Optionally, any call attempts to the wireless telephone during this waiting period are disallowed, i.e., no attempt is made to contact the wireless telephone over the wireless telephone service provider's network. Furthermore, resources of the wireless telephone service provider, as well as of other telephone service providers, may be conserved, and unnecessary costs avoided, by disallowing call attempts to the wireless telephone during the waiting period, even if the caller of the wireless telephone call that could not successfully complete is not notified of the availability of the wireless telephone upon its registration. Additionally, if the wireless telephone shares communication facilities with a wireless data station, no attempt is made to transfer data to or from the wireless data station during the waiting period. Instead, the data is queued, and the queued data is transmitted after the registration is received.

DETAILED DESCRIPTION

Unnecessary expenses associated with making telephone calls to wireless telephones that have become unavailable are avoided, in accordance with the principles of the invention, by a) marking as unavailable a wireless telephone to which a wireless telephone call could not successfully be completed; b) waiting for the wireless telephone to register, i.e., signal its availability to receive calls; and c) notifying the caller of the wireless telephone call that could not successfully complete that the wireless telephone is now available.

Figure 1:
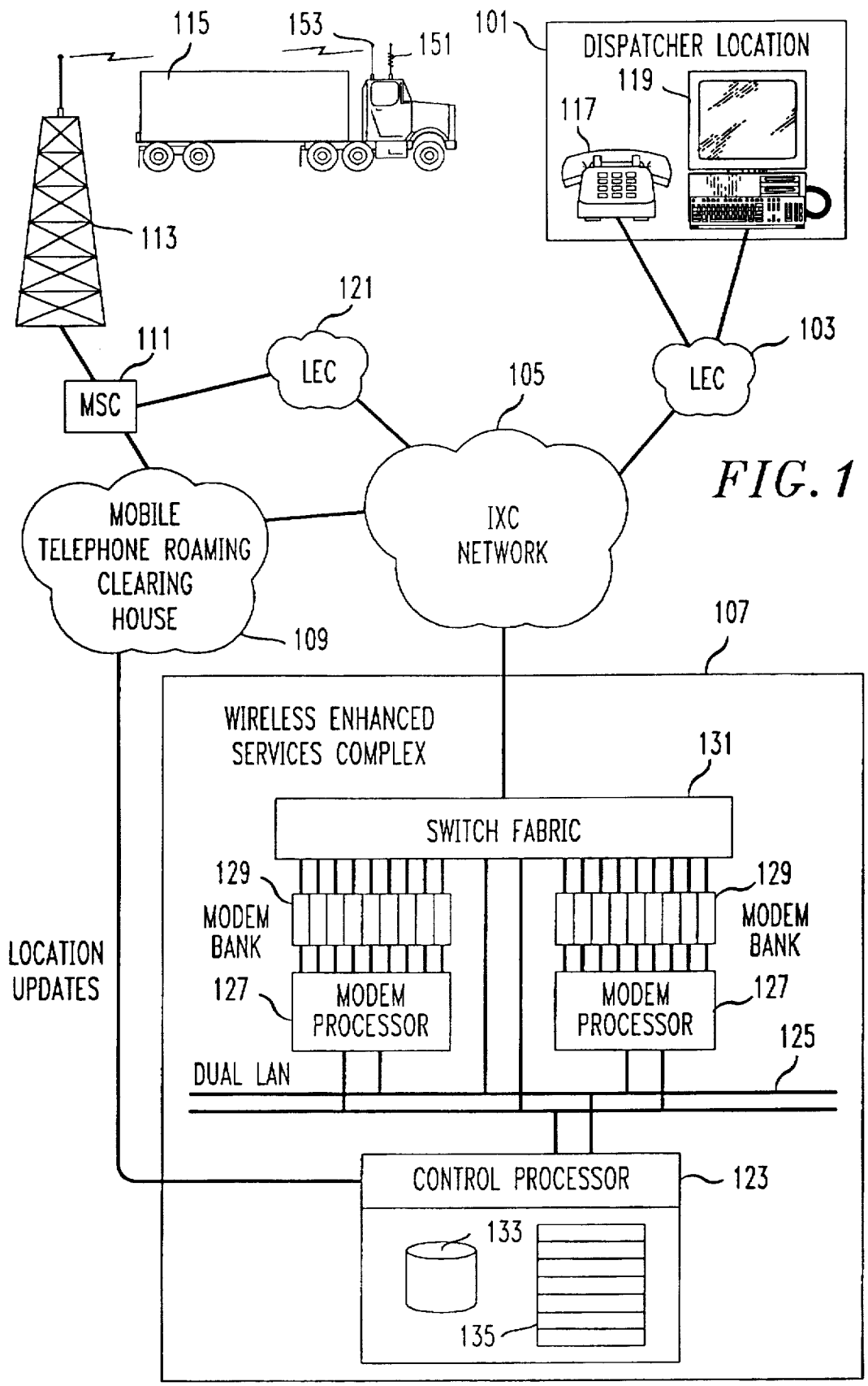
FIG. 1 shows an overview of a truck location and communication system which operates in accordance with the principles of the invention.

Before proceeding directly to a description of a process embodying the invention, it is useful to understand the context in which the invention was developed and in which it is being used, namely, a truck dispatching and control application. Therefore, FIG. 1 shows an overview of a truck location and communication system which affords truck dispatchers 1) the ability to determine the location and other information regarding each truck for which the dispatcher is responsible as well as 2) the ability to communicate with such trucks wherever they are. The truck location and communication system includes a) dispatcher location 101, b) local exchange carriers (LECs) 103 and 121, c) interexchange carrier (IXC) 105, d) wireless enhanced services complex (WESC) 107, e) mobile telephone roaming clearing house 109, f) mobile switching center (MSC) 111, g) mobile base antenna tower 113, and h) truck 115.

Dispatcher location 101 includes telephone 117 and terminal 119, which has a built-in modem. Telephone 117 and terminal 119 are each connected to LEC 103 via respective telephone lines. A dispatcher at dispatcher location 101 uses terminal 119 to view the locations of each truck and exchange data with the trucks. For example, terminal 119 is a personal computer running display and data communication software. The dispatcher uses telephone 117 for voice communication with the drivers of the trucks.

LECs 103 and 121 are employed in the conventional manner to achieve connections to IXC network 105. It is noted that LECs 103 and 121 may be the same. IXC network 105 is employed to establish connections from truck 115 and dispatcher location 101 to wireless enhanced services complex 107. Wireless enhanced services complex 107 may be thought of as being located "in" or "behind" IXC network 105 as those terms are conventionally used in the art.

The conventional purpose of mobile telephone roaming clearing house 109 is to authenticate mobile telephone subscribers who are roaming outside of their home service area. One well known mobile telephone roaming clearing house is provided by GTE Telecommunications Services Incorporated (TSI). In particular, for the present application, mobile telephone roaming clearing house 109 receives a location indication from MSC 111 whenever a truck enters a new service area. This location indication is described further below. It is relayed by mobile telephone roaming clearing house 109 to wireless enhanced services complex 107. Despite being coarse, the location indication provides a first approximation of the location of the truck that has been found to be very useful in long haul trucking applications. Advantageously, it is provided at no additional cost to the trucking company using the truck location and communication system.

MSC 111 is used to establish mobile telephone communications with truck 115 via mobile base antenna tower 113.

MSC 111 also transmits a location indication for truck 115 whenever truck 115 activates its mobile telephone within the area served by MSC 111. In particular, the location indication is provided in response to the transmission of a "*19" signal from the mobile telephone in truck 115 to MSC 111. Conventionally, in cellular telephone communication, the transmission of a * 19 indicates a request to deactivate cellular roaming. MSC 111 forwards the "*19" signal to mobile telephone roaming clearing house 109 along with the mobile identification number (MIN) of the transmitting truck 115.

Mobile telephone roaming clearing house 109 is preprogrammed to recognize the MINs of mobile telephones used in trucks that are served by wireless enhanced services complex 107. When mobile telephone roaming clearing house 109 receives a *19 transmission from a mobile telephone having a MIN belonging to a truck served by a wireless enhanced services complex 107, mobile telephone clearing house 109 transmits a location indication update to wireless enhanced services complex 107 identifying the mobile service provider now serving truck 115 rather than performing the conventional cellular roaming deactivation.

Wireless enhanced services complex 107 includes a) control processor 123, b) dual local area network (LAN) 125, c) modem processors 127, d) modem banks 129 and e) switch fabric 131. Control processor 123 provides all the computational capability necessary to control the overall operation of wireless enhanced services complex 107. Control processor 123 contains memory 133 and code 135. Memory 133 is used to store information such as a list of trucks using the service as well as for temporary storage of data being communicated between the trucks and dispatcher location 101. Code 135 is used to store the computer instructions which operate control processor 123.

Dual LAN 125 provides connectivity between control processor 123, modem processors 127 and switch fabric 131. It is a dual LAN for reliability purposes. Modem banks 129 are each made up of one or more modems which are used to transmit and receive information over telephone lines. Modem processors 127 are each responsible for controlling the individual modems within the respective modem banks 129. Modem processors 127 also pass data between switch fabric 131 and control processor 123 via their respective one of modem banks 129 and dual LAN 125. Lastly, switch fabric 131 provides connections between telephone lines of IXC network 105 and the proper modem of modem banks 129. Switch fabric 131 can also connect together, i.e., bridge, two telephone lines from IXC network 105.

Figure 2:
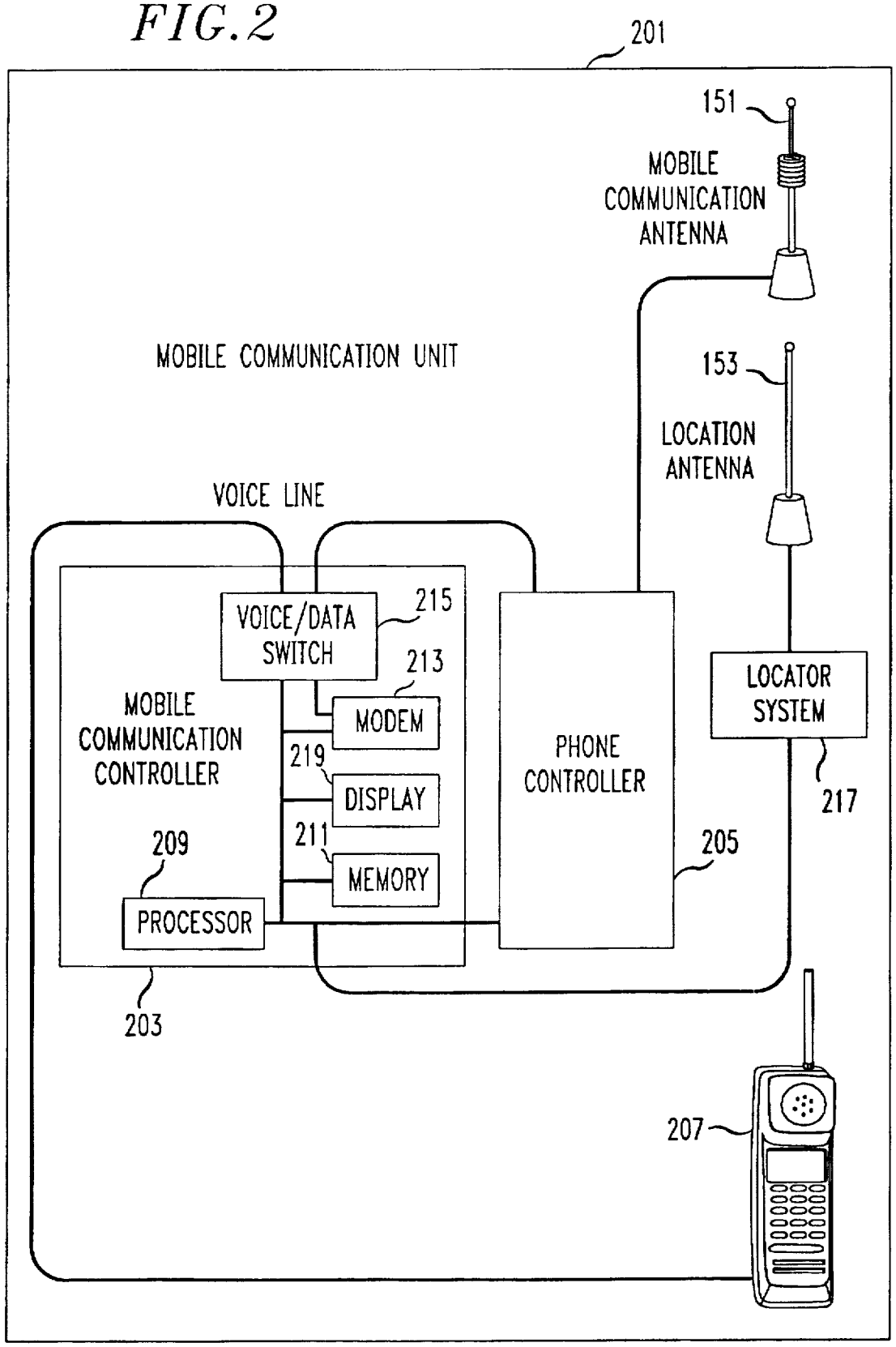
FIG. 2 shows an exemplary mobile communication unit used in the truck of FIG. 1.

FIG. 2 shows an exemplary mobile communication unit 201 used in truck 115 to communicate with wireless enhanced services complex 107 and ultimately dispatcher location 101. Mobile communication unit 201 includes a) mobile communication controller 203, b) phone controller 205, c) telephone handset 207, d) mobile communication antenna 151, e) locator system 217 and f) location antenna 153.

Mobile communication controller 203 includes 1) processor 209, 2) memory 211, 3) modem 213, 4) voice/data switch 215, and 5) display 219. Processor 209 provides all the computation capability necessary to control the overall operation of mobile communication unit 201. Modem 213 is used to convert data from processor 209 to a form suitable for transmission over a mobile telephone channel. Memory 211 stores, among other things, accumulated data for ultimate transmission to dispatcher location 101 as well as data received from dispatcher location 101. Data received from dispatcher location 101 is displayed for the driver of the truck on display 219.

Voice/data switch 215 is used to control the source that is connected to the mobile telephone channel. Either telephone handset 207 or modem 213 may controllably be given access to the mobile telephone channel. Voice/data switch 215 is responsive to commands from processor 209 to determine whether telephone handset 207 or modem 213 is given access to the mobile telephone channel.

Phone controller 205 provides the capability to transmit and receive communication over the mobile telephone channel. Phone controller 205 accesses the mobile telephone channel via mobile communication antenna 151.

Locator system 217 receives triangulation information via location antenna 153 to determine the precise location of truck 115. This information is stored in memory 211 for ultimate transmission to dispatcher location 101. Such locator systems are well known.

It is possible for the truck to become unavailable to receive communications from dispatcher location 101 via wireless enhanced services complex 107. Such unavailability may result, for example, because 1) the truck, and all the equipment therein, has been turned off, e.g., the driver is out of the truck taking a break at a rest area, 2) the truck is in a location at which a wireless telephone channel cannot be accessed, e.g., the truck is under an overpass or in a mountainous region, or out of range of any mobile base antenna tower 113. This unavailability condition may persist for an indefinite period of time. However, if the dispatcher continues to attempt to call the truck additional costs will be incurred without any benefit.

Figure 3:
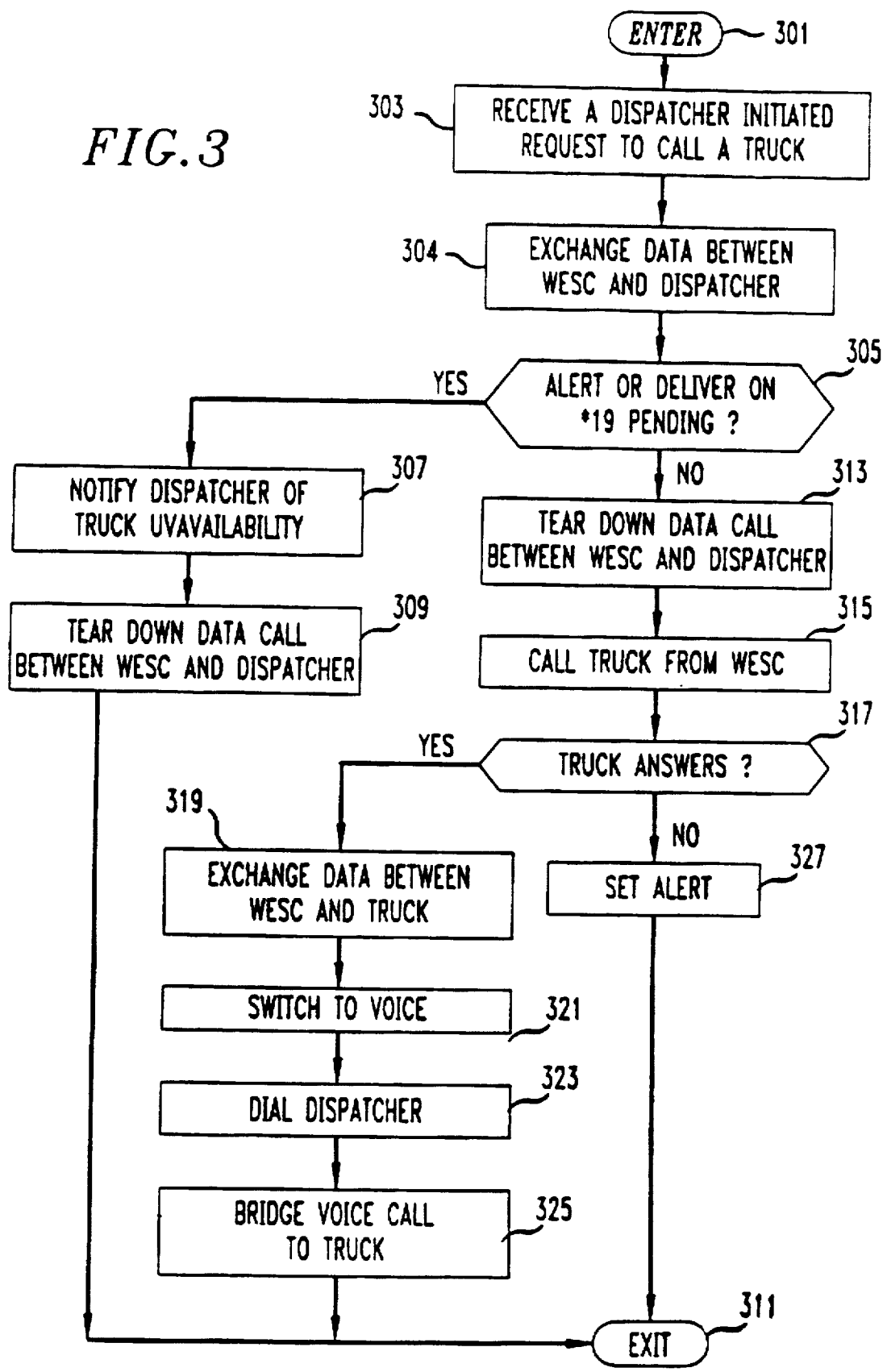
FIG. 3 shows an exemplary process which implements aspects of the invention in the context of the truck location and communication system of FIG. 1.

FIG. 3 shows an exemplary process which avoids the incurring of such additional costs, in accordance with the principles of the invention, by a) marking as unavailable a wireless telephone to which a wireless telephone call could not successfully be completed; b) waiting for the wireless telephone to register, i.e., signal its availability to receive calls; and c) notifying the caller of the wireless telephone call that could not successfully complete that the wireless telephone is now available.

The process is entered in step 301 when a data call is originated from dispatcher location 101 requesting a voice communication telephone call with truck 115. This data call is originated from terminal 119. The call passes through LEC 103 and IXC 105 and is received, in step 303 at wireless enhanced services complex 107. At wireless enhanced complex 107 the call passes to control processor 123 via switch fabric 131, a modem of modem bank 129, modem processor 127 and dual LAN 125. In step 304 data is exchanged between dispatcher location 101 and wireless enhanced services complex 107. Data received by wireless enhanced services complex 107 is stored in memory 133. It is noted that the data that is exchanged need not be solely associated with truck 115 but may be associated with any truck that communicates with dispatcher location 101.

Control processor 123 tests to determine, in step 305, if an "alert", or "deliver on * 19" is pending. An "alert" is a stored indication that a previous attempt has been made to establish a voice communication telephone call with the particular truck 115 and that attempt was unsuccessful. A "deliver on *19" is a stored indication that a previous attempt has been made to deliver data to the particular truck and that attempt was unsuccessful. In accordance with the principles of the invention, if the test result in step 305 is YES, indicating that as of the last attempt to communicate with the truck it was unavailable, control passes to step 307, in which control processor 123 transmits a message back to dispatcher location 101 notifying the dispatcher that the truck is unavailable. The data call is then disconnected, i.e., torn down, in step 309. The process is then exited in step 311.

If the test result in step 305 is NO, indicating that the truck has previously been available, control passes to step 313, in which the data call between dispatcher location 101 and wireless enhanced services complex 107 is torn down. Next, in step 315, control processor 123 attempts to place a data call to truck 115. This data call is established via dual LAN 125, modem processor 127, a modem of modem bank 129, switch fabric 131, IXC network 105, LEC 121, MSC 111, and mobile base antenna tower 113. Control then passes to conditional branch point 317, which tests to determine if the truck has successfully received the call, i.e., the truck answered the call.

If the test result in step 317 is YES, indicating that the truck is now available for voice communication, control passes to step 319, in which wireless enhanced services complex 107 exchanges data with truck 115. This is done by downloading to truck 115 any information stored in memory 133 for truck 115 and receiving from truck 115 any data stored in memory 211. Next, in step 321, wireless enhanced services complex 107 transmits a message to mobile communication unit 201 instructing mobile communication controller 203 to place voice/data switch 215 in the voice communication mode. Doing so connects telephone handset 207 to phone controller 205.

In step 323, wireless enhanced services complex 107 places a voice communication telephone call to telephone 117 at dispatcher location 101. This is done by having switch fabric 131 seize an available line to IXC network 105 generating call origination signals, e.g., dual tone multifrequency signals, in order to indicate to IXC network 105 the destination of the call. Upon completion of dialing, control passes to step 325, in which switch fabric 131 bridges the seized line with the line on which the call to truck 115 was placed. To this end, switch fabric 131 disconnects from the call the modem through which the data call to truck 115 passed at enhanced services complex 107. As a result, the truck driver is able to speak with the dispatcher at telephone 117. The process then exits in step 311.

If the test result in step 317 is NO, indicating the truck has become unavailable, control passes to step 327, in which wireless enhanced services complex 107 sets an "alert" for truck 115, in accordance with the principles of the invention. Optionally, the dispatcher may be notified that truck 115 is unavailable and that an "alert" has been set. The process then exits in step 311.

Figure 4:
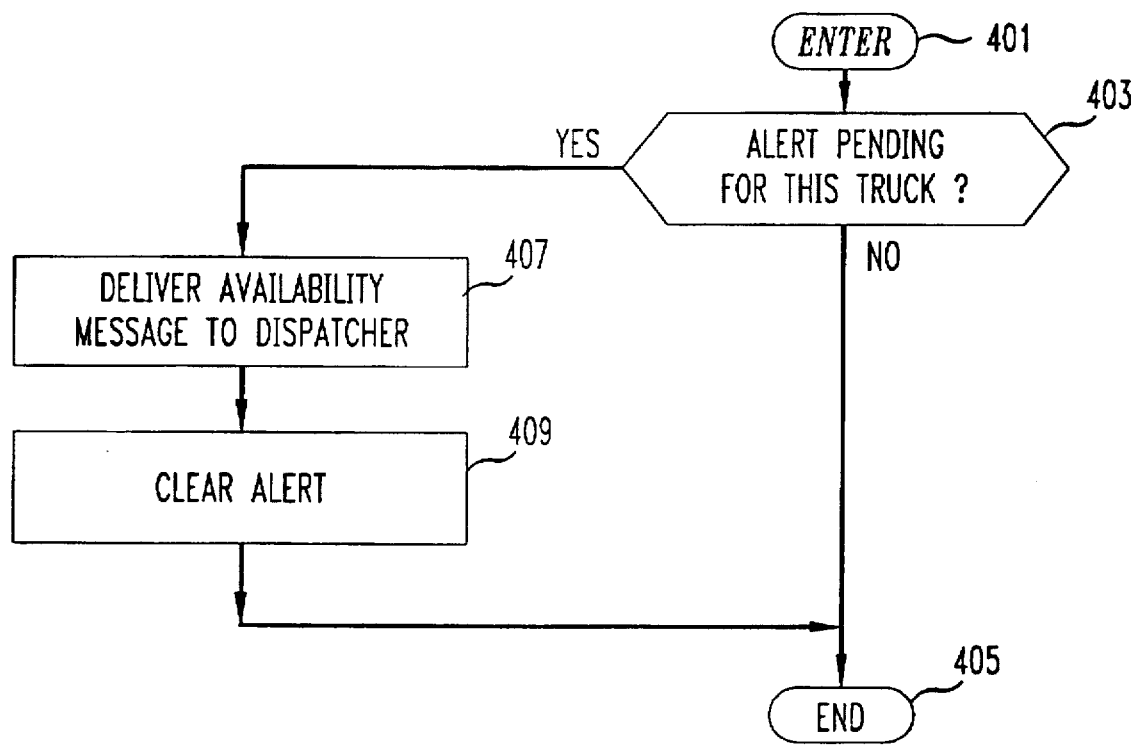
FIG. 4 shows an exemplary process performed in wireless enhanced services complex of FIG. 1 for clearing "alerts" and for informing a dispatcher that a truck is now available in accordance with the principles of the invention.

FIG. 4 shows an exemplary process performed in wireless enhanced services complex 107 for clearing "alerts" and for informing a dispatcher that a truck is now available in accordance with the principles of the invention. The process is entered in step 401 when a "* 19 " is received for a truck. In conditional branch point 403 wireless enhanced services complex tests to determine if an "alert" is pending for the truck for which the "*19" was just received. If the test result in step 403 is NO, control passes to step 405 and the process is exited. If the test result in step 403 is YES, indicating that the truck for which the "*19" just received had previously been unavailable, control passes to step 407.

In step 407, a message is delivered from wireless enhanced services complex 107 to terminal 119 at dispatcher location 101 indicating that the truck has just become available, in accordance with an aspect of the invention. Next, in step 409, the "alert" is cleared. In accordance with the principles of the invention clearing the "alert" allows voice communication telephone calls to be attempted to truck 115. The process is then exited in step 405.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in providing wireless telephone service, comprising the steps of:

marking as unavailable a wireless telephone to which a wireless telephone call could not successfully be completed;

waiting for the wireless telephone to signal its availability to receive calls;

receiving a registration signal from said wireless telephone; and in response to receipt of said registration signal, notifying the caller of said wireless telephone call that could not be successfully completed, that said wireless telephone is now available, wherein the notifying the caller is conducted independent of the wireless telephone call that could not be successfully completed.

2. The invention as defined in claim 1 wherein call attempts to said wireless telephone that are received during said waiting step are disallowed.

3. The invention as defined in claim 1 wherein said marking step is performed in the network of a service provider distinct from the provider of wireless service to said wireless telephone.

4. The invention as defined in claim 1 wherein the wireless telephone shares communication facilities with a wireless data station and further including the step of disallowing data transfers to said wireless data station during said waiting step.

5. A method for use in providing wireless telephone service, comprising the steps of:

marking as unavailable a wireless telephone to which a wireless telephone call could not successfully be completed;

waiting for the wireless telephone to signal its availability to receive calls; and receiving an availability signal from said wireless telephone; and in response to receipt of said availability signal, notifying the caller of said wireless telephone call that could not be successfully completed, that said wireless telephone is now available.

6. The invention as defined in claim 5 wherein no attempt is made to connect to said wireless telephone over a wireless telephone service provider's network for call attempts to said wireless telephone that are received during execution of said waiting step.

7. A method for use in providing wireless telephone service, comprising the steps of:

marking as unavailable a wireless telephone to which a wireless telephone call could not successfully be completed;

waiting for the wireless telephone to signal its availability to receive calls; and disallowing call attempts to said wireless telephone that are received during said waiting step.

8. Apparatus for use in providing wireless telephone service, comprising the steps of:

means for marking as unavailable a wireless telephone to which a wireless telephone call could not successfully be completed; and means for disallowing call attempts to be sent through to said wireless telephone that are received while said wireless telephone is marked as unavailable.

9. A method for use in a vehicle location and communications system, comprising the steps of:

receiving from a requester a request to establish a voice communication telephone call with a vehicle;

determining that said vehicle was unavailable at the time that an immediately preceding request to communicate with said vehicle was made and that said vehicle has not registered since then; and transmitting to said requester a notification that said voice communication telephone call with said vehicle cannot be established, wherein the transmitting is conducted independently of the voice communication telephone call with the vehicle that could not be established.

10. The invention as defined in claim 9 wherein said vehicle is a truck.

11. The invention as defined in claim 9 further comprising the step of:

receiving a registration from said vehicle; and establishing a wireless connection between said vehicle and said requester.

12. The invention as defined in claim 11 wherein said establishing step further comprises the steps of: establishing a first connection from an intelligent communication system to said vehicle;

establishing a second connection from said intelligent communication system to said requester; and bridging said first and second connections.

13. Apparatus for use in providing wireless voice telephone service, comprising the steps of:

means for marking as unavailable a wireless telephone to which a wireless telephone call could not successfully be completed; and means for disallowing call attempts to be sent through to said wireless telephone that are received while said wireless telephone is marked as unavailable.

14. The invention as defined in claim 13 further including:

means for receiving a registration from said wireless telephone;

means responsive to receipt of said registration for placing a wireless telephone call to said wireless telephone;

means for marking said wireless telephone as available when said placed wireless telephone call successfully connects to said wireless telephone.

15. The invention as defined in claim 13 wherein said apparatus is located external to the network of any wireless telephone service provider.

16. The invention as defined in claim 13 wherein said apparatus is located external to the network of a wireless telephone service provider over which said wireless telephone call could not successfully be completed.

* * * * *